Sept. 9, 1969  R. M. KIERNAN  3,466,059

COMMERCIAL TRICYCLE CONSTRUCTION

Filed July 11, 1967

INVENTOR.
ROBERT M. KIERNAN
BY

*Alan E. Steele*

ATTORNEY.

United States Patent Office 3,466,059
Patented Sept. 9, 1969

3,466,059
COMMERCIAL TRICYCLE CONSTRUCTION
Robert M. Kiernan, 3 Radding St.,
Manchester, Conn. 06040
Filed July 11, 1967, Ser. No. 652,572
Int. Cl. B62m 1/02, 1/06
U.S. Cl. 280—261                                    1 Claim

ABSTRACT OF THE DISCLOSURE

A commercial tricycle construction having two sprockets juxtapositioned at one end of the brake assembly, one sprocket engaging a drive chain from and aligned with the pedal sprocket, an idler sprocket mounted in between these two sprockets which also engages the drive chain. The second sprocket engaging a chain which drives the rear axle sprocket, and the members of the frame forming a welded unitary junction at either side of the brake assembly at which junction the brake assembly is mounted to the frame.

---

This invention relates to tricycle construction and more particularly to the chain drive assembly and frame construction required for ruggedness, accessibility and ease of maintenance on such vehicles.

With the ever increasing mechanization and expansion of our industrial plants, means for simple and reasonable transportation around these plants for expediters, messengers and small parts shipments is in great demand. The tricycle is one of the most economical ways to meet this demand. However, such a vehicle must be dependable, rugged and its parts must be easily accessible for ease of maintenance. The manufacturers of commercially available tricycles have not met this demand, partly because of its preoccupation with bicycle production and in a greater part because the tricycles presently marketed are not offered at reasonable prices.

Similarly people finding themselves with more spare time have turned to outside activities and certain groups of people, more particularly our senior citizens, find pleasure in cycling but require the security of a tricycle.

It has been found that a conventional bicycle can readily be converted to a tricycle by means of kits which are available on the market. Although the kit is successful in the final result, it has been found to be too complex in the number of parts required, difficult to gain accessibility to the drive assembly for maintenance and does not enhance the structural integrity of the frame.

By resort to this invention, one can easily produce the desired tricycle utilizing a conventional bicycle frame by substituting a rear axle having two wheels and modifying the coaster brake assembly to accept the drive chain assembly and form a unitary junction for the tricycle frame. This can be accomplished in the original production of tricycles, or by modifying the existing bicycle to tricycle conversion kits. A preferred embodiment of this invention comprises an additional sprocket mounted alongside the one supplied with a conventional brake assembly, the outside sprocket is driven and aligned with the drive sprocket on the conventional bicycle and the inner sprocket drives and is aligned with the driven sprocket on the rear axle. The alignment of the two sprockets on the brake assembly minimizes the coupling effect of the forces from the front drive chain and that of the rear drive chain. Mounted on the side of the frame is an idler sprocket which is aligned with the outside sprocket of the brake assembly and the drive sprocket of the conventional bicycle. This idler sprocket is adjustable to increase or decrease tension in the drive chain. The supports for the rear axle and the conventional bicycle frame are rigidly joined by welding thereby forming a junction which receives the brake assembly. The operation of this tricycle is therefore the same as a bicycle in propulsion, coasting and braking.

A further object of this invention is to provide a tricycle having a unitary frame construction.

Another object of this invention is to provide a tricycle drive assembly which minimizes sprocket wear and fatiguing of the brake assembly.

Still another object of the invention is to provide an idler sprocket which is readily adjustable for ease of accessibility and maintenance of the tricycle drive assembly.

The more important objects of my invention have been outlined broadly above in order that a more detailed description that follows may be better understood. There are, of course, additional objects of my invention that will be described hereinafter and which will form the subject of the claims appended hereto.

The objects and advantages of the invention will become apparent from the following description taken in conjunction with the accompanying drawings in which.

Figure 1:
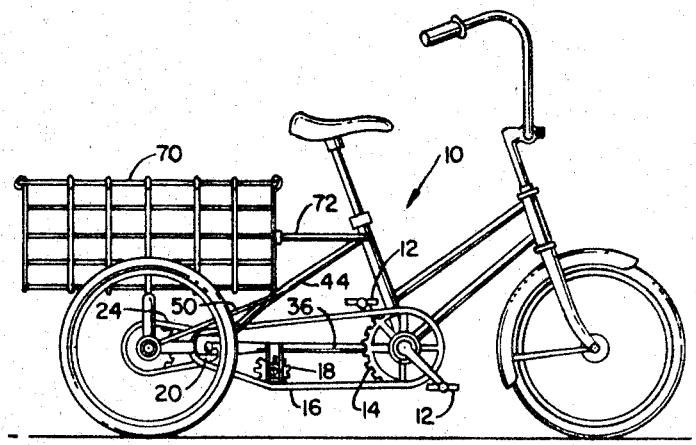
FIGURE 1 is a side view of a tricycle incorporating the preferred embodiment of my invention.

Referring to the drawings which illustrate preferred embodiments of the tricycle constructed in accordance with the present invention, FIGURE 1 shows the general arrangement of the tricycle construction. The construction as shown utilizes a girl's bicycle frame 10, however one may use any type of commercial bicycle frame. Mounted on frame 10 is the conventional main drive sprocket 14 which is rigidly secured to pedals 12—12. A main drive chain 16 which engages main drive sprocket 14, idler sprocket 18 and driven sprocket 20 forms the front half of the drive assembly. The rear half of the drive assembly comprises drive sprocket 22, chain 24 and driven sprocket 26 which is mounted on rear axle 28.

The tricycle frame 10 is assembled from two halves, one being the conventional bicycle frame shown to the right of brake assembly 30, and the other rear axle 28. The tube 32 which encases rear axle 28 has two arms 34—34 welded to it on either side of driven sprocket 26. The free ends of arms 34—34 have slots 38—38 formed in them. To each of these arms 34—34 at the slotted ends are welded the ends of horizontal forks 36—36 of the bicycle frame. It should be noted that the horizontal forks 36—36 ends also have slots in them and should be lined up with slots 38—38 of the arms and the welds applied at 40, 42. The original bicycle frame has angular forks 44—44 which come welded to horizontal forks 36—36 at junction 46. After horizontal forks 36—36 are welded to arms 34—34, slots 38—38 should be filed and opening 48 enlarged to allow entry of brake assembly 30. The complete frame is now a unitary structure without any fasteners which may shake loose and weaken its structural integrity. This is best viewed in FIGURE 2. To increase the structural integrity of the frame at the rear end, 2 angular brackets 50—50 on either side of arms 34—34 are welded to U tube 52 and to each of the angular forks 44—44 as shown in FIGURE 1.

Brake assembly 30 is a conventional brake which has been reassembled with the flange on the sprocket side removed and in lieu of the flange, a second sprocket is mounted and welded in place along side the original sprocket. It should be noted, referring to FIGURE 3, that the original sprocket 22 is aligned with driven sprocket 26 mounted on rear axle 28, and that outside driven sprocket 20 is aligned with drive sprocket 14 and idler sprocket 18. In selecting driven sprocket 20 one may choose the diameter and number of teeth to give the desired speed increase from the drive sprocket 14. The brake assembly 30, thus reassembled is placed in slot 38—38, taking care that brake assembly axle 54 is parallel to rear axle 28, and positioned laterally until inside sprocket 22 is aligned with sprocket 26, and outside sprocket is aligned with drive sprocket 14 and idler sprocket 18. The two nuts 56—56 are then tightened on threaded outside portions of axle 54 against the side of slots 38—38. Brake support arm 58 is then fastened to the left horizontal fork 36 by means of band 60.

Figure 2:
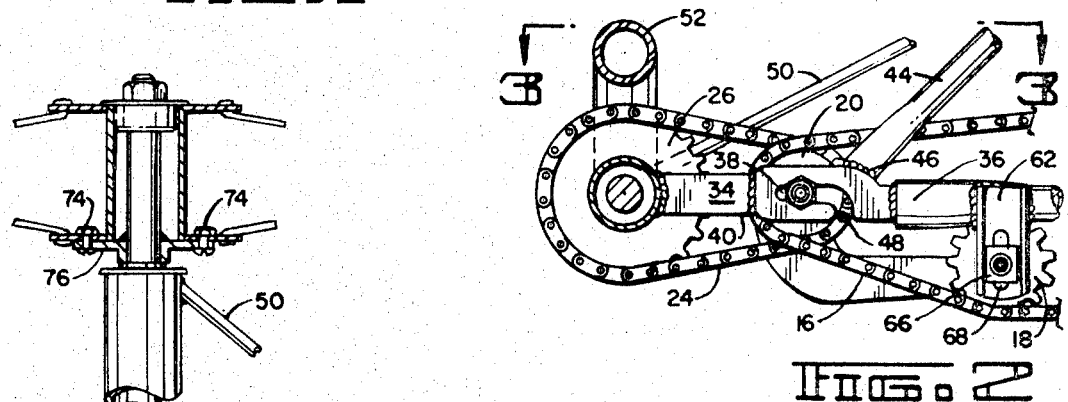
FIGURE 2 is a fragmentary side view of the drive assembly rearward of the main drive sprocket and the junction of the tricycle frame which houses the brake assembly.

Idler sprocket 18 is adjustably mounted to bracket 62 whic his welded to the right horizonal fork 36 as shown in FIGURE 2. Idler 18 can therefore be adjusted vertically to give the desired tension in chain 16. The adjustment of idler 18 is accomplished by loosening bolt 64 held by nut 66 in the channel portion of bracket 62, so as to allow it to move vertically in slot 66 in bracket 62, and then bolt 64 is tightened when the desired tension in chain 16 is reached. Chain 16 is wrapped so as to engage drive sprocket 14, idler sprocket 18 and driven sprocket 20 and this length of chain is closed and made continuous by fastening the ends of the chain together with connector links. Similarly rear chain 24 is wrapped so as to engage drive sprocket 22 and driven sprocket 26 and closed with connector links. Proper tension in chain 24 is accomplished by moving brake assembly 30 horizontally in slot 38—38 prior to tightening nuts 54—54.

From the aforedescribed construction, two advantages become immediately apparent. One, that since the two sprockets 20, 22 mounted on brake assembly are juxtapositioned and close to the axis of the vehicle, the coupling effect on brake assembly 30 by forces in chains 16 and 24 are minimized and are much less than ones presently employed when the sprockets 20 and 22 are considerably spaced from one another. This minimizing of the coupling effect increases the life of the brake assembly 30 and does away with any additional supports for the brake assembly now utilized by other types of construction. Secondly, any problem with chain 16, usually slack or loss of tension, is readily remedied by a simple adjustment on idler 18, while other types of construction without this idler require loosening of brake assembly 30, and repositioning which will effect tension in chain 24 and also cause another aligning problem of trial and error.

Figure 3:
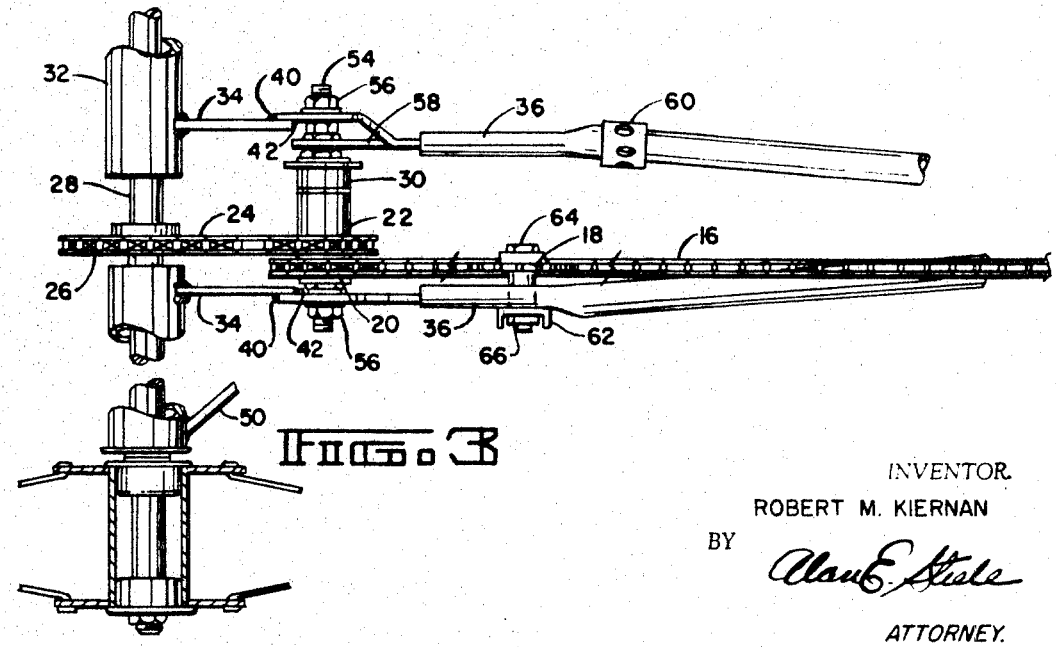
FIGURE 3 is a fragmentary plan view as viewed along section 3—3 on FIGURE 2.

The rear axle 28 is of the type commercially available where only one wheel, the wheel on the left side of the cyclist as shown in FIGURE 3, is driven by being bolted by bolts 74 to flange 76 which is firmly welded to the axle, while the right wheel is mounted freely rotate on axle 28. This gives the desirable differential action on turns and curves. Integral to tube 32 covering axle 28 is U tube 52 welded to tube 32 so that the U portion is above the axle 28. For industrial purposes a basket 70 is bolted to the U tube and further supported by brackets 72. If one wishes, the basket 70 may be replaced with a pick-up carrier, rear platform or whatever special attachment one wishes to use.

While I have described my invention in detail with reference to accompying drawings illustrating a preferred embodiment of my invention, it is understood that numerous changes in the details of construction and arrangement of parts may be made.

I claim:
1. A tricycle construction comprising a frame having a front wheel mounted thereon, a main drive sprocket mounted on the base of said frame, a rear axle having a wheel mounted on each end of said axle, a horizontal yoke having its apex integral with the lower portion of a vertical seat post on said frame, an angular yoke having its apex integral with the upper portion of said seat post, said yokes being welded together at the two junctions where their corresponding ends meet, a first driven sprocket mounted substantially midway between the ends of said axle, tubular housing means enclosing substantial portions on either side of said first driven sprocket, a pair of support arms welded to said tubular portion one on each side of said first driven sprocket, the opposite ends of said support arms welded to each of the junctions formed by the ends of said yokes, a slot formed in each of said functions, a brake assembly mounted in said slots and affixed thereto by fastener means, said brake assembly having two sprockets which are juxtapositioned and mounted thereon, one sprocket being a driver and drives said first driven sprocket via a first continuous chain, the other sprocket is a second driven sprocket being driven by said main drive sprocket via a second continuous chain, an idler sprocket mounted on one of the sides of said horizontal yoke at a point between said brake assembly and said main drive sprocket and engages said second continuous chain.

References Cited
UNITED STATES PATENTS

| | | | |
|---|---|---|---|
| 1,700,631 | 1/1929 | Festini | 74—242.11 |
| 3,229,988 | 1/1966 | Mansperger | 280—7.15 |
| 3,258,272 | 6/1966 | Hendricks | 280—7.15 |
| 3,258,273 | 6/1966 | Matthews | 280—7.15 |

KENNETH H. BETTS, Primary Examiner

U.S. Cl. X.R.
280—7.15, 282